United States Patent
Winther et al.

(10) Patent No.: US 8,641,892 B2
(45) Date of Patent: Feb. 4, 2014

(54) BARREL-TYPE FISH/PARTICLE SCREEN WITH ADJUSTABLE FLOW DISTRIBUTION AND DEBRIS REMOVAL

(76) Inventors: John L. Winther, Orinda, CA (US); Blake Andrew Toland, Walnut Creek, CA (US)

( * ) Notice: Subject to any disclaimer, the term of this patent is extended or adjusted under 35 U.S.C. 154(b) by 108 days.

(21) Appl. No.: 13/113,772

(22) Filed: May 23, 2011

(65) Prior Publication Data

US 2012/0298568 A1 Nov. 29, 2012

(51) Int. Cl.
- E02B 9/04 (2006.01)
- B01D 29/33 (2006.01)
- B01D 29/68 (2006.01)
- B01D 35/02 (2006.01)
- B01D 35/157 (2006.01)
- E02B 5/08 (2006.01)

(52) U.S. Cl.
CPC ... *E02B 9/04* (2013.01); *E02B 5/08* (2013.01); *B01D 29/33* (2013.01); *B01D 29/68* (2013.01); *B01D 35/02* (2013.01); *B01D 35/1573* (2013.01); *B01D 2201/084* (2013.01); *B01D 2201/44* (2013.01)
USPC ........ 210/155; 210/159; 210/162; 210/170.1; 210/170.11; 210/333.01; 210/338; 210/411; 210/429; 210/430; 210/461; 405/81; 405/127

(58) Field of Classification Search
USPC .................. 210/155, 159, 162, 170.09, 170.1, 210/170.11, 333.01, 337, 338, 411, 429, 210/430, 431, 459, 460, 461, 485, 489, 498, 210/499; 405/81, 127
See application file for complete search history.

(56) References Cited

U.S. PATENT DOCUMENTS

| | | | | | |
|---|---|---|---|---|---|
| 705,364 | A | * | 7/1902 | Kurtz | 210/460 |
| 3,037,636 | A | * | 6/1962 | McFarlin | 210/460 |
| 4,210,539 | A | * | 7/1980 | Shiban | 210/391 |
| 5,108,592 | A | * | 4/1992 | Wilkins et al. | 210/155 |
| 5,650,073 | A | * | 7/1997 | Merrett | 210/170.09 |
| 6,036,850 | A | * | 3/2000 | Reynolds | 210/430 |
| 6,051,131 | A | * | 4/2000 | Maxson | 210/162 |
| 6,682,651 | B1 | * | 1/2004 | Toland et al. | 210/155 |
| 6,712,959 | B2 | * | 3/2004 | Ekholm et al. | 210/162 |
| 6,758,344 | B2 | * | 7/2004 | Gordon | 210/411 |
| 7,201,842 | B2 | * | 4/2007 | Kiefer | 210/162 |
| 2003/0089658 | A1 | * | 5/2003 | Dreyer et al. | 405/127 |
| 2007/0175834 | A1 | * | 8/2007 | Osborne et al. | 405/127 |

* cited by examiner

*Primary Examiner* — Christopher Upton
(74) *Attorney, Agent, or Firm* — Kilpatrick Townsend & Stockton LLP

(57) ABSTRACT

Debris adhering to the outer surface of a barrel-type fish screen is cleared by air bursts from a series of perforated air pipes positioned inside the outer foraminous shell of the screen, the perforations being holes with axes at an acute angle to the screen radius for efficient use of the air. Separately, the conical water collection manifold mounted inside the shell is open at its narrow end, with a valve mounted to that open end to control the opening. The opening prevents reduced water inflow at that end of the manifold, and the valve adjusts the access of the surrounding water to the opening, thereby allowing the manifold to be tuned to more closely approach a uniform distribution of axial water flow along the length of the collection manifold for different ambient conditions. Webs joining the air pipes to the collection manifold are also included in certain embodiments of the invention to support increased lengths of the entire apparatus without loss of structural integrity, including support for the foraminous shell.

15 Claims, 7 Drawing Sheets

BARREL-TYPE FISH/PARTICLE SCREEN WITH ADJUSTABLE FLOW DISTRIBUTION AND DEBRIS REMOVAL

BACKGROUND OF THE INVENTION

1. Field of the Invention

This invention relates to the transfer of water from bodies of water that are populated by live fish or particulate matter, or both. In particular, this invention addresses concerns encountered in the use of barrel-type fish screens that are designed to prevent fish and/or particulate matter from entering water intake vessels.

2. Description of the Prior Art

Water is often drawn from lakes, rivers, oceans, and other natural bodies of water for use by manufacturing plants, municipalities, irrigation systems, power plants, and other large operating facilities. Since these bodies of water typically support aquatic life that includes fish and other aquatic animals, screens commonly referred to as "fish screens" are commonly used to prevent the animals and particulate matter from entering the intake vessels through which the water is drawn and thus to prevent contamination and damage to units in the facilities such as pumping systems, deaeration systems, and the like. The fish screens also preserve the viability of the aquatic animals and prevent them from injury, thereby helping to maintain the ecosystem in the body of water.

A common form of fish screen is the "barrel-type" screen which is a cylindrical screen mounted to the water intake vessel, which is typically a pipe, the screen and pipe being coaxial and joined together at one end of the cylinder. Water enters the screen through the sides of the cylinder and travels axially within the cylinder before entering the pipe, while the fish are kept outside. Within the cylinder and prior to entering the pipe, the water passes through a collection manifold, which is a perforated and truncated cone that extends the length of the cylinder with the widest end of the cone at the location of the pipe. The perforated cone serves as a flow modifier to even out the inflow of water along the axis of the cylinder, i.e., to achieve a uniform axial velocity of flow within the cone, independently of the total flow rate of water into the cylinder. Evening out the inflow in this manner is important both in avoiding trauma to the aquatic life in the surrounding water by spreading the inflow along the length of the screen, and in minimizing or preventing dead volume within the cylinder that create nonunifoimity of inflow along the cylinder length. Inflow nonuniformity nevertheless remains a challenge. Uniform and continuous flow also requires that the screen be kept clear of debris, including plant and animal debris and solid particulate matter in general that tend to collect on the outer screen surface and clog the screen openings. The cylindrical screen is typically supported over the perforated cone by an open rib structure, providing the entire fish screen with its barrel-type construction. The two opposing ends of the rib structure are secured to plates at the opposing ends of the perforated cone.

SUMMARY OF THE INVENTION

One of the discoveries forming the basis of the present invention is that one site of nonuniformity of water inflow along the length of the cylinder axis is at the narrow end of the conical collection manifold, i.e., the end opposite the location of the water intake vessel through which the water leaves the fish screen. With the manifold typically closed off at this end, the water within the collection manifold at this end is at relatively high pressure and therefore has a reduced velocity head, causing a reduced flow rate into the collection header at this end. In one aspect of this invention, this localized reduction in flow is addressed by placing a valve over this narrow end rather than permanently closing it off, the valve allowing the narrow end to vary between being closed off entirely and being open to allow an axial inflow of water at that end, rather than only a radial inflow through the sides of the manifold. The position of the valve can thus be adjusted to provide optimal flow for any of a range of conditions, and thereby to accommodate for example differences in ambient conditions and differences in the rate at which water is being drawn through the collection manifold by the intake vessel.

In another aspect of this invention, the need to maintain the cylindrical screen clear of debris while minimizing or avoiding harm to the aquatic life surrounding the screen is addressed by the placement of perforated air pipes between the cylindrical screen and the conical collection manifold, and particularly near the inner surface of the screen, the pipes having holes that are oriented such that the axes of the holes form an acute angle with the radius of the screen and collection manifold. When pressurized air is fed through the pipes, therefore, the air jets emerging from the holes will strike the cylindrical screen at close proximity to the screen surface and at an acute angle rather than in a direction perpendicular to the surface. This non-perpendicular angle of impact causes air from the holes to be distributed across the entire outer surface of the screen, thereby covering a greater area of the screen before penetrating the screen to dislodge the debris on the outside surface. This provides better cleaning of the screen and uses less air. In addition, the air bursts will have a lesser impact on the surrounding water at the outer sides of the screen opposite the pipes than the impact created by direct radial jets and will also avoid or lessen the disruptive noise cause by air jets of the prior art. These effects will minimize trauma to aquatic life in the water adjacent to the screen.

In yet another aspect of this invention, the conventional open rib structure of barrel-type fish screens of the prior art is replaced by webs as rigid connecting members connecting the air pipes to the collection manifold, tapering along their lengths to match the taper of the collection manifold. The air pipes thereby serve as structural flanges or struts, and the webs provide structural support to the along the entire length of the fish screen. This allows for easy placement, removal, and replacement of the foraminous shell, while also allowing the entire fish screen to be made longer in relating to its diameter, i.e., a greater length/diameter ratio, without loss of structural integrity for the cylindrical shape of the shell.

These and other objects, advantages, and features of the invention and its various embodiments will be more apparent from the descriptions that follow.

DETAILED DESCRIPTION OF INDIVIDUAL EMBODIMENTS

Figure 1:
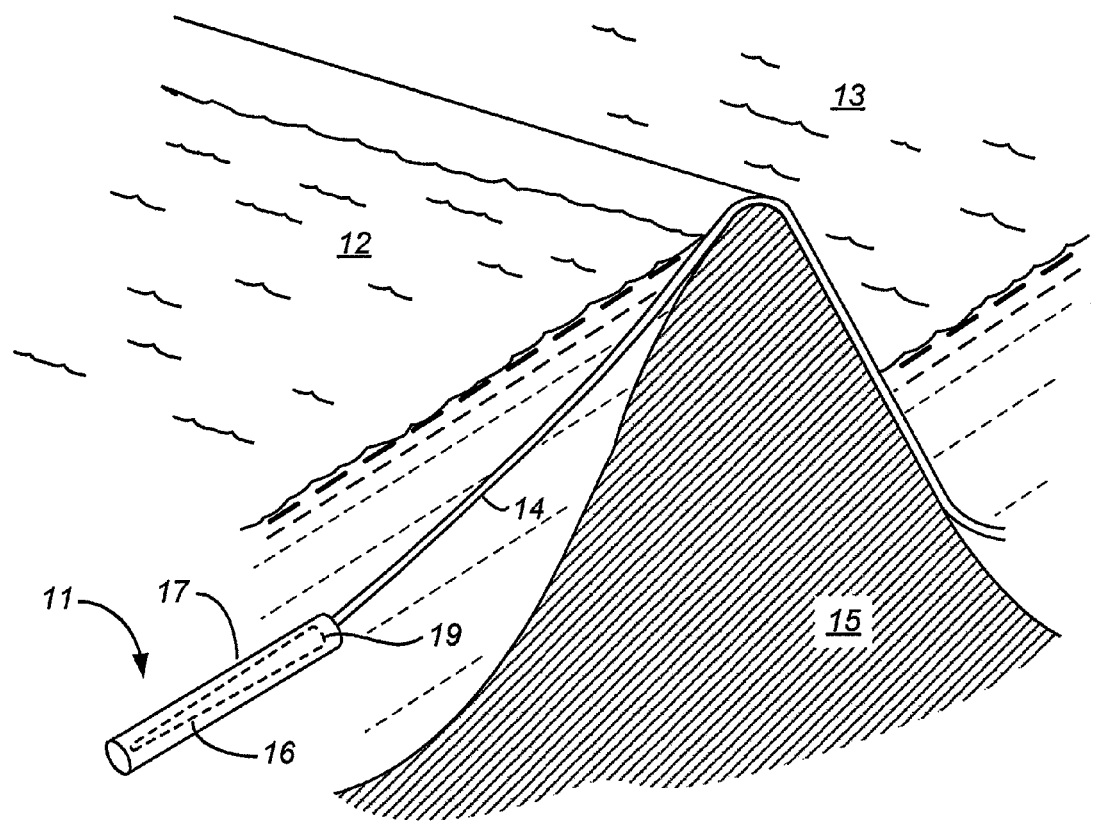
FIG. 1 is a perspective cross section of two bodies of water, one being fed by the other through a siphon pipe, with one example of a fish and particulate screen in accordance with the present invention mounted to the intake of the siphon pipe.

The cylindrical screen that forms the outer portion of the fish screens addressed herein is referred to herein as a foraminous cylindrical shell. The word "shell" denotes that the screen is the outermost component of the apparatus and surrounds the inner components including the collection manifold. The term "cylindrical" is used to denote that the shell is a lateral enclosure with a longitudinal axis and a substantially uniform cross section along the length of the axis. The term is intended to include enclosures whose cross section is a circle (circular cylinders) as well as those whose cross section is a closed curve other than a circle, such as an ellipse, and those whose cross section is a polygon, such as a hexagon or an octagon. In most implementations of this invention, the cylindrical shell will have a generally circular cross section. The term "foraminous" is used herein to denote a sheet that has openings distributed over its surface. Examples of foraminous materials that can be used in forming the cylindrical shell are perforated sheet metal, wedge wire, and meshes in general. Other examples will be readily apparent to those of skill in the art. The sizes of the openings can also vary widely and will be selected to meet the specifications for a particular site, including the types and sizes of aquatic animals present at the site and the needs of the facility drawing the water through the screen. These specifications are typically set by regulatory agencies in the region in which the screen is used. The material from which the shell is made can vary widely provided that it is sufficiently sturdy to withstand currents in the body of water, chemically inert to the water and any substances dissolved in the water, and nontoxic to the aquatic life therein. Metals such as aluminum and steel, notably copper/nickel stainless steel, are examples of such materials, although plastics can be used as well.

The terms "water intake" and "water intake vessel" are used interchangeably herein to refer to any vessel that serves as a conduit for the conveyance of water from the fish screen to the facility for which the water is being extracted from the lake, river, ocean or other body of water. In many cases, the water intake is a length of pipe or tubing.

The term "substantially conical" in describing the collection manifold denotes that the cross section of the collection manifold is a closed curve that is uniform in shape along the length of its longitudinal axis but decreasing in size such that the area defined by the closed curve continuously narrows along the axis, the manifold thus tapering from a wide end to a narrow end. The manifold is most often a truncated cone, i.e., rather than tapering to a point, the manifold tapers to a relatively small but finite cross sectional area. Substantially conical manifolds referred to herein include those whose cross section is a circle (circular cones) as well as those whose cross section is a closed curve other than a circle, such as an ellipse, and those whose cross section is a polygon, such as a hexagon or an octagon. In most implementations of this invention, the cylindrical shell will have a polygonal cross section, primarily for ease of manufacture.

While the features described above are capable of implementation in a wide variety of constructions, the features will be best understood by a detailed examination of specific embodiments. Such an examination is provided by the attached Figures.

FIG. 1 illustrates the use of a fish and particulate screen 11 in accordance with the present invention in a siphoning operation that draws water from a freshwater estuary 12 to a collection reservoir 13 through a siphon pipe 14 that passes over a levee 15. The siphon pipe 14 in this example is the water intake vessel mentioned above. The screen includes a conical collection manifold 16 (shown in dashed lines) mounted inside a foraminous cylindrical shell 17. The screen is supported above the estuary floor in any manner that does not disrupt the flow of water in the areas surrounding the screen. The siphon pipe 14 is joined to the larger end 19 of the conical collection manifold 16.

Figure 2:
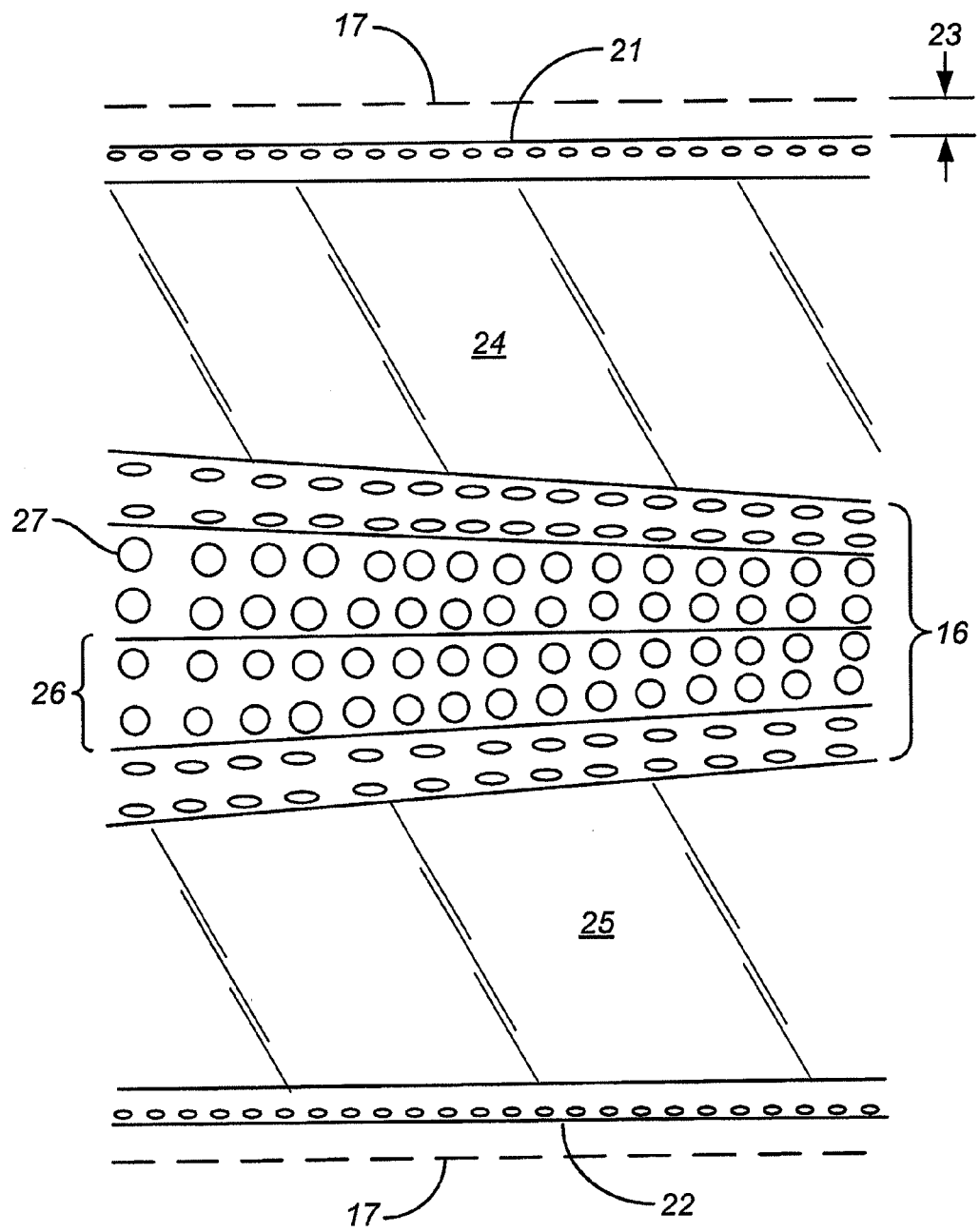
FIG. 2 is a side view of a portion of the screen in FIG. 1.

FIG. 2 is a side view of the fish screen along a portion of the length of the screen, with all parts in front of the collection manifold 16 removed to permit viewing of the manifold. The foraminous cylindrical shell 17 is shown in dashed lines in this Figure, and inside the shell are the perforated air pipes of which only two 21, 22 are visible. The pipes 21 are mounted in close proximity to the inner surface of the shell 17 and extend parallel to the shell for substantially the length of the shell. The pipes can contact the shell tangentially or can be spaced inward from the shell by a small clearance 23 as shown. The pipes thus serve as struts to support the shell, and the clearance is such as to form a loose fit of the shell over the pipes, i.e., loose enough to allow the shell to be slid over the pipes. A convenient arrangement is one in which the shell slides loosely over the pipes, possibly resulting in intermittent contact. In certain cases, the shell is somewhat flexible in construction, and the pipes provide a means of structural support to the shell.

The pipes 21, 22 are rigidly secured in this case to the collection manifold 16 by webs 24, 25 which are flat plates that taper to match the taper of the collection manifold. While the webs are shown as solid plates in this Figure, open webs, lattices, or struts or radial support rods can also be used, provided that they connect the pipes to the collection manifold at points along their lengths. The collection manifold 16 in this case is formed by welding together tapered strips 26 of metal, producing a generally conical shape in which the cross section is a polygon rather than a circle. Each strip 26 is perforated with holes 27 that allow water to pass into the manifold. The holes in this Figure are circular holes, all equal in size and arranged in rows, each row extending the full length of the manifold, with substantially equal spacing between adjacent holes in each row. The area of the hole openings per unit length of the collection manifold is substantially constant per unit length of the manifold, in accordance with the teachings of U.S. Pat. No. 6,682,651 B1, issued Jan. 27, 2004.

Figure 3:
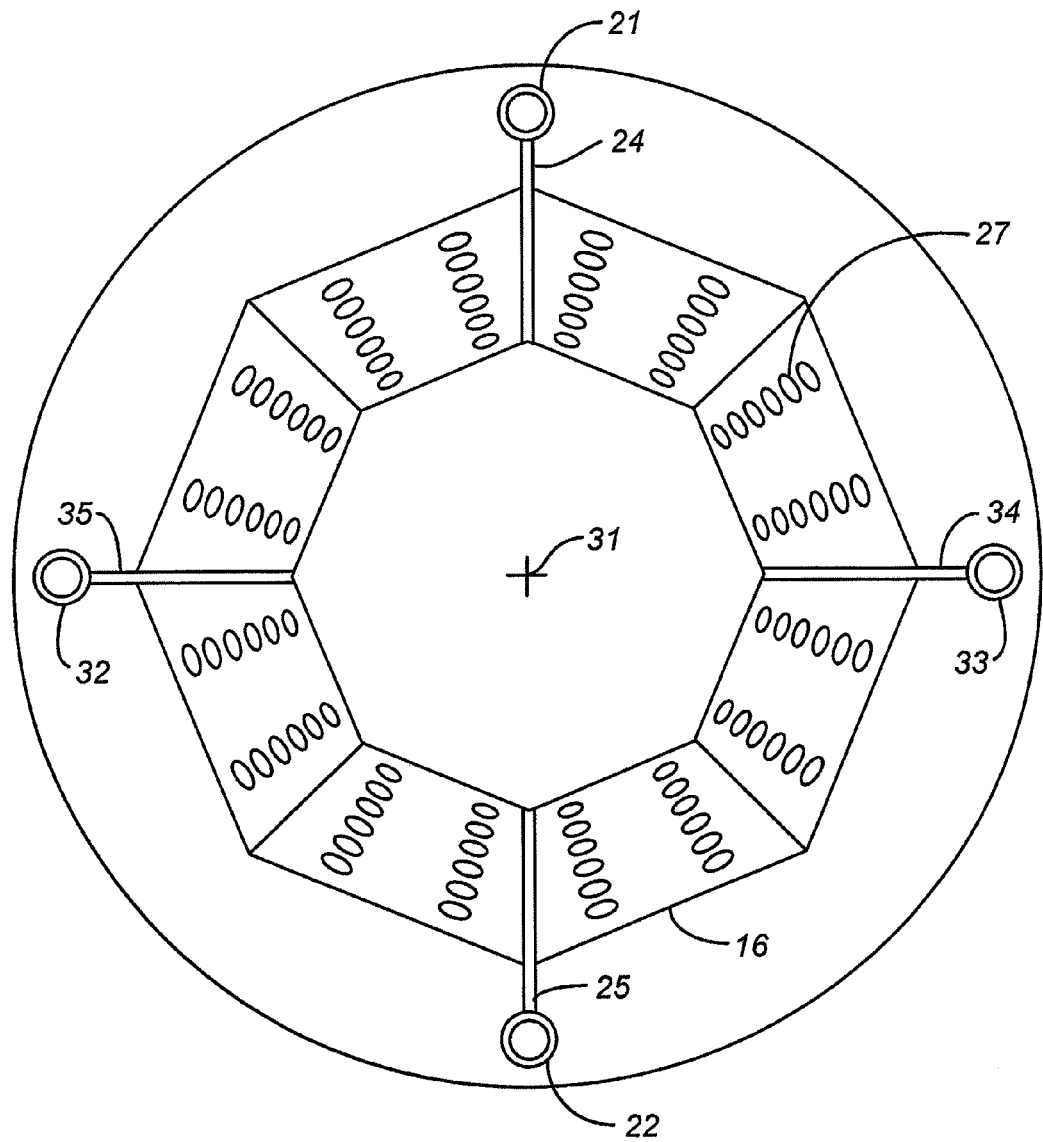
FIG. 3 is a transverse cross section of the screen of FIGS. 1 and 2.

FIG. 3 is a cross section of the apparatus intersecting the longitudinal axis 31 of the collection manifold 16. In this example, the collection manifold 16 is octagonal in cross section, and four perforated air pipes 21, 22, 32, 33 are included, each with a separate supporting web 24, 25, 34, 35 joining the pipe to the outer surface of the collection manifold 16. The number of pipes is not critical and can vary. In certain cases, for example, as few as three pipes will be adequate, while in others, six or more pipes will be preferred. In most cases, three to six pipes will suffice. Screens of larger diameters will generally benefit from larger numbers of pipes. Also in this Figure, the pipes are evenly distributed around the axis 31, although this is likewise noncritical.

Figure 4:
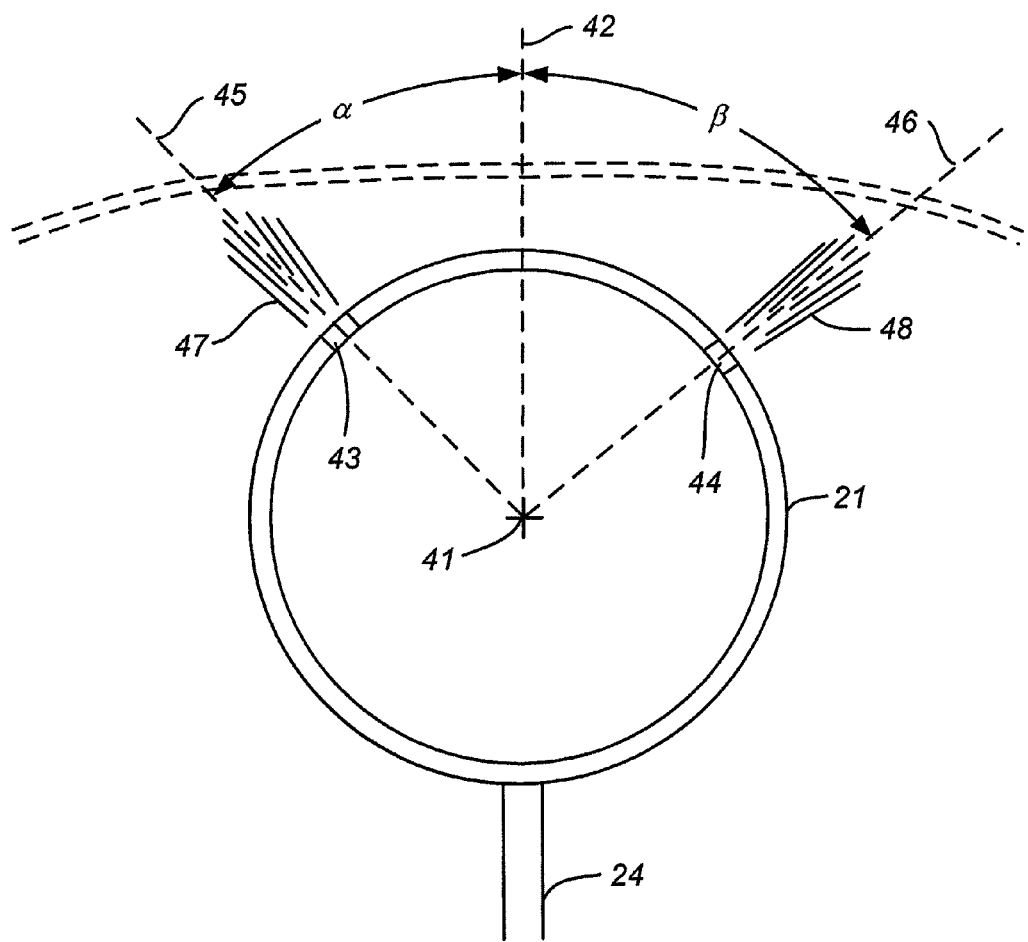
FIG. 4 is a transverse cross section of one of the air pipes of the screen of FIGS. 1 and 2.

An enlarged view of one pipe 21 and the nearby portion of the foraminous shell 17 is presented in cross section in FIG. 4. The pipe 21 has a circular cross section and a pipe axis 41 which is parallel to the axis 31 of the collection manifold (FIG. 3). A radial reference line 42 is shown extending outward from the pipe axis 41 in a direction perpendicular to the inner surface of the shell 17, and also passing through the axis 31 of the collection manifold. The pipe is perforated with two rows of holes 43, 44, each row being perpendicular to the plane of the Figure. Each hole has a hole axis 45, 46 passing through the center of the hole, and the holes are oriented such that the hole axes 45, 46 form acute angles $\alpha$, $\beta$ with the radial reference line 42. The angles $\alpha$, $\beta$ can vary, but in most cases best results will be obtained with angles that are within the range of about 30 degrees to about 60 degrees, or often within the range of about 40 degrees to about 50 degrees. Bursts of air from the pipe interior are ejected through these holes to penetrate the foraminous shell 17 and remove solid matter that may have accumulated on the outer surface of the shell. With the holes oriented at acute angles, the air jets 47, 48 emerging from these holes strike the foraminous shell 17 at angles rather than perpendicular to the shell, and thereby spread the air along the inner surface of the shell before it passes through the shell. The jets will typically be strong enough to produce turbulence in the regions adjacent to the inner surface of the shell, which will further promote the lateral distribution of the air before it penetrates the shell.

Figure 5:
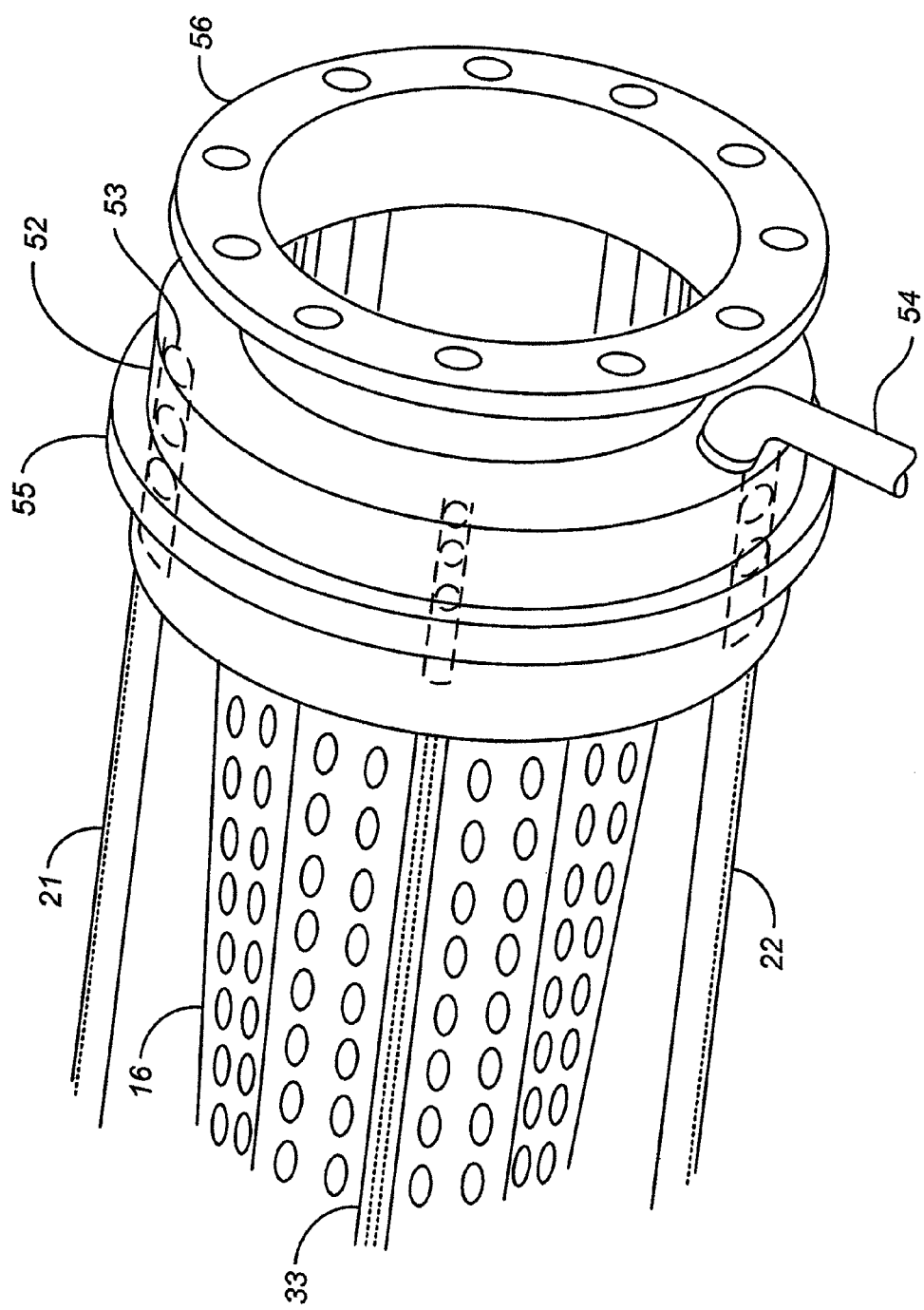
FIG. 5 is a perspective view of one end of the screen of FIGS. 1 and 2 with the outer shell removed.

Air feed to the pipes is illustrated in FIG. 5, which is a perspective view of the end of the apparatus at which the screen is joined to the water intake vessel (not shown). In this view, the foraminous cylindrical shell has been removed from the structure. Visible in the Figure however are the collection manifold 16, and three of the perforated air pipes 21, 22, 33. The air pipes are all supplied by an air plenum which is the hollow interior of a toroidal end cap 52, the pipes extending into the plenum with the pipe sections inside the plenum having large holes 53 to admit the air. Air from an external source of compressed air (a pump or a compressed air tank, for example) enters the plenum through an air intake line 54, and the timing and duration of the air bursts are controlled by conventional valves (not shown) on the intake line. A ridge 55 around the outer surface of the end cap 52 serves as a stop for the foraminous shell (now shown) as the shell is slid over the pipes. The end cap 52 terminates in a mounting flange 56 by which the end cap, and hence the collection manifold 16, are mounted to the water intake vessel (not shown).

Figure 6:
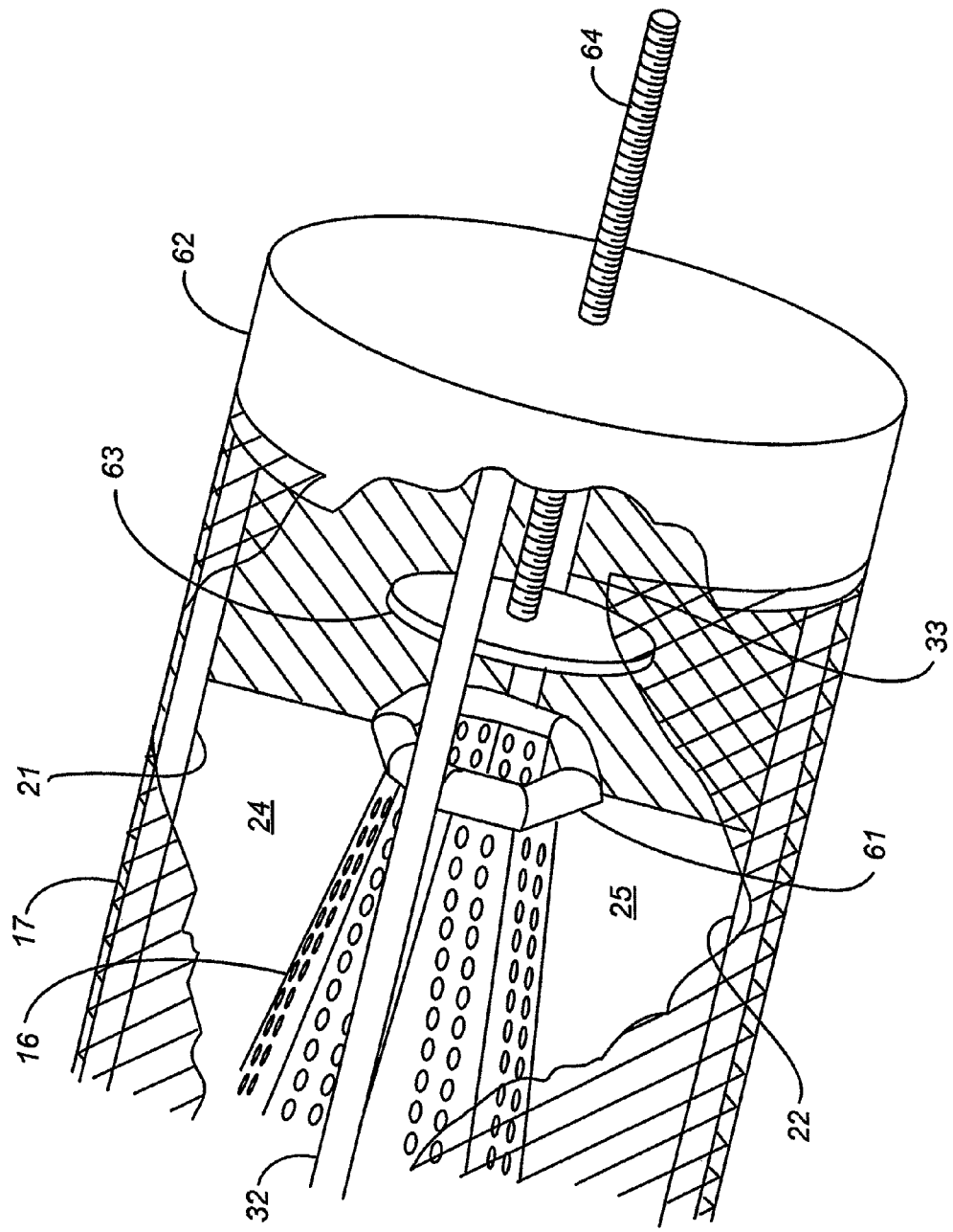
FIG. 6 is a perspective view of the opposing end of the screen of FIGS. 1 and 2 with a portion of the outer shell removed.

The end of the apparatus opposite the end that is joined to the water intake vessel is shown in FIG. 6. The foraminous shell 17 is shown in this Figure, but part of the shell has been removed to show the collection manifold 16 and the four pipes 21, 22, 32, 33. The small end of the collection manifold 16 is open and terminates in a tubular ring 61 welded to the exterior surface of the open end of the manifold. The tubular ring in this case is formed from eight tube sections welded together to conform to the octagonal cross section of the collection manifold 16. Manifolds of other cross sections will use tubular rings shaped accordingly. A functional feature of the tubular ring 61 is its smooth radially curved surface which provides the collection manifold 16 with a flared opening to ease the flow of water through the opening into the manifold. In this regard, the tubular ring 61 can be replaced with any flared structure.

Figure 7:
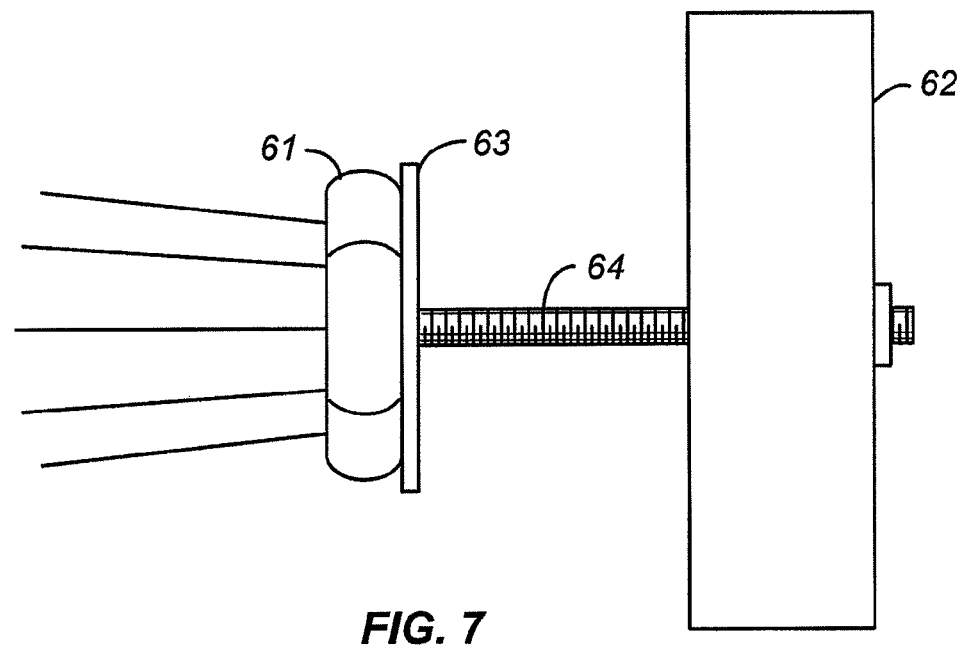
FIG. 7 is a side view of the internal valve of the screen of FIGS. 1 and 2 in a closed position.
Figure 8:
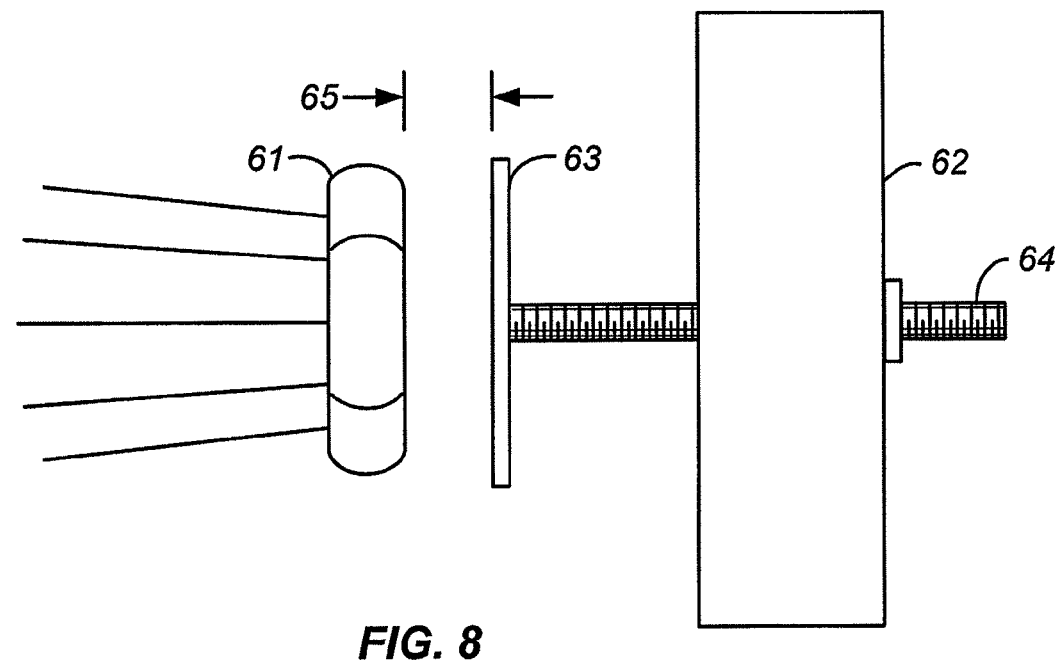
FIG. 8 is a side view of the valve of FIG. 7 in a partially open position.

The apparatus terminates at this end in an end cap 62 to which a disk 63 is mounted by a leadscrew 64. The disk 63, tubular ring 61, and leadscrew 64 collectively form a valve that provides for variable closing of the narrow end of the collection manifold 16. The valve is shown in closed and partially open positions in FIGS. 7 and 8, respectively. In the closed position, the disk 63 abuts the tubular ring 61, while in its open position, a gap 65 separates the disk from the ring to allow water to enter axially through the end of the manifold. The width of the gap can be varied to control the rate of axial water inflow.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A screen for preventing fish and/or particulates from entering a water intake vessel, said screen comprising:
    a substantially conical collection manifold having a longitudinal manifold axis, perforated side walls, and first and second ends, said first end having a smaller cross section than said second end, and said second end joined to said water intake vessel; and
    a foraminous cylindrical shell covering said collection manifold;
    the improvement comprising a valve on said first end providing variable water inflow to said collection manifold through said first end.

2. The screen of claim 1 wherein said valve comprises a plate substantially perpendicular to said longitudinal manifold axis and means for moving said plate along said longitudinal manifold axis.

3. The screen of claim 2 further comprising a plurality of struts joined to said foraminous cylindrical shell, said struts distributed around said collection manifold, parallel to said manifold axis, and terminating at first and second plates at said first and second ends, respectively, of said collection manifold, and said valve is a third plate mounted to said first plate by a leadscrew.

4. The screen of claim 2 further comprising a plurality of struts joined to said foraminous cylindrical shell, said struts distributed around said collection manifold, parallel to said manifold axis, each said strut joined to said collection manifold by a web providing rigid support to said strut along the length of each said strut.

5. The screen of claim 2 wherein said first end terminates in a flared opening.

6. The screen of claim 5 wherein said flared opening is formed by a tubular ring surrounding said first end.

7. The screen of claim 1 further comprising a plurality of pipes residing within said cylindrical shell, said pipes distributed around said longitudinal manifold axis and each pipe having a pipe axis substantially parallel to said longitudinal manifold axis, each said pipe perforated with holes, each said hole having a hole axis forming an acute angle with a radial line extending radially from said longitudinal manifold axis and passing through said pipe axis.

8. The screen of claim 7 further comprising means for supplying air to interiors of each of said pipes.

9. The screen of claim 8 wherein said means for supplying air is an air plenum at said second end of said collection manifold, communicating with each of said pipes.

10. The screen of claim 7 wherein said pipes extend at least the full length of said cylindrical shell, and said holes are distributed substantially the full length of each of said pipes.

11. The screen of claim 7 wherein each said pipe has at least two rows of said holes, including a row on each side of a radial plane passing through said longitudinal manifold axis and said pipe axis.

12. The screen of claim 7 wherein said acute angle is from about 30 degrees to about 60 degrees.

13. The screen of claim 7 wherein said acute angle is from about 40 degrees to about 50 degrees.

14. The screen of claim 7 wherein said plurality of pipes consist of from three said pipes to six said pipes and are spaced at substantially equal spacings around said longitudinal manifold axis.

15. The screen of claim 7 wherein each pipe of said plurality of pipes is mounted to said collection manifold by a web providing rigid support to said pipe along the length of each said pipe.

* * * * *